United States Patent [19]

Rau et al.

[11] 4,442,271
[45] Apr. 10, 1984

[54] PREPARATION OF PROPYLENE HOMOPOLYMERS OR COPOLYMERS

[75] Inventors: Wolfgang Rau, Heidelberg; Helmut Klamann, Ludwigshafen; Peter Hennenberger, Freinsheim, all of Fed. Rep. of Germany

[73] Assignee: BASF Aktiengesellschaft, Fed. Rep. of Germany

[21] Appl. No.: 382,344

[22] Filed: May 26, 1982

[30] Foreign Application Priority Data

Jun. 11, 1981 [DE] Fed. Rep. of Germany ....... 3123115

[51] Int. Cl.$^3$ ........................... C08F 2/34; C08F 10/06
[52] U.S. Cl. ........................................ 526/61; 526/67; 526/68; 526/901; 526/905
[58] Field of Search ............................. 526/61, 68, 901

[56] References Cited

U.S. PATENT DOCUMENTS 4,012,573  3/1977  Trieschmann et al. ............... 526/68

FOREIGN PATENT DOCUMENTS 449068  5/1975  U.S.S.R. ............................. 526/68

Primary Examiner—Edward J. Smith
Attorney, Agent, or Firm—Keil & Witherspoon

[57] ABSTRACT

The disclosure is directed to an improvement in the gas phase polymerization of propylene using a Ziegler-Natta catalyst in the presence of hydrogen wherein the gaseous propylene is withdrawn from the reactor, cooled and condensed and returned as a liquid to the reactor in order to regulate the polymerization temperature. The amount of the gaseous phase in the condenser-cooler-accumulator system is kept constant by regulating the amount of gaseous phase returned to the reactor.

1 Claim, 1 Drawing Figure

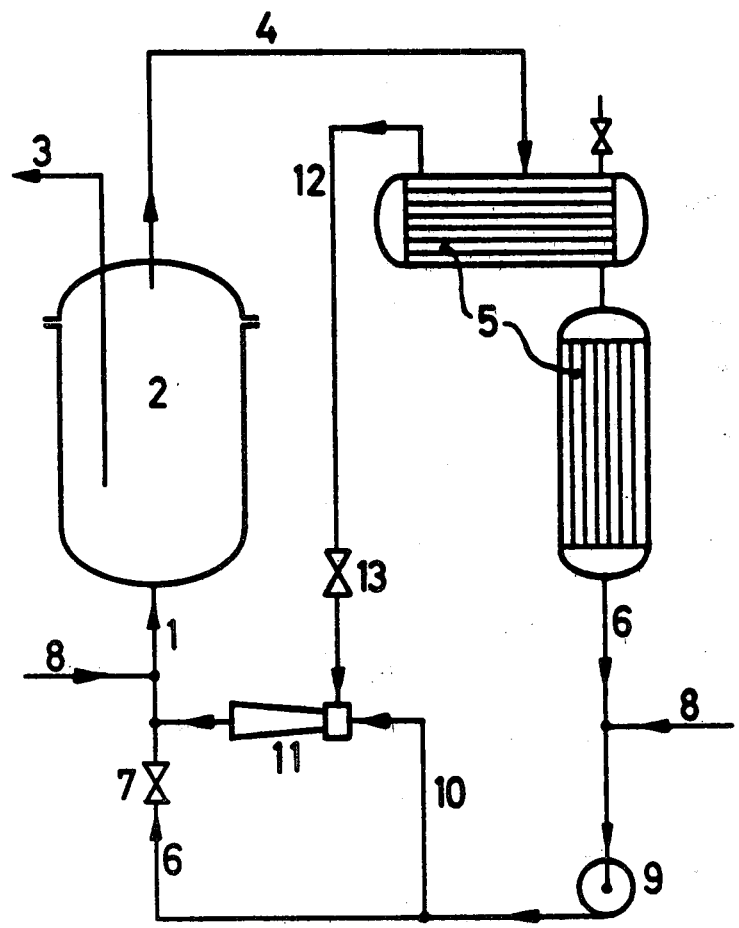

PREPARATION OF PROPYLENE HOMOPOLYMERS OR COPOLYMERS

The present invention relates to a process for the preparation of a propylene homopolymer or copolymer which contains more than 50, especially more than 80, % by weight of propylene and less than 50, especially less than 20, % by weight of other α-monoolefins, of 2 to 6, especially of 2 to 4, carbon atoms, as copolymerized units, by polymerizing the monomer or monomers in the presence of hydrogen as a molecular weight regulator, using a Ziegler-Natta catalyst, at from 40° to 150° C., especially from 50° to 110° C., under a total pressure of from 10 to 50 bar, especially from 15 to 40 bar, in the gas phase in a stirred loose bed of finely divided polymer, with removal of the heat of polymerization by evaporative cooling, the monomer mixed with hydrogen being introduced continuously or batchwise into a polymerization kettle (2) via a line (1), and the polymer being discharged continuously or batchwise from the polymerization kettle (2) via a discharge line (3), with the provisos that (a) the pressure and temperature in the polymerization kettle (2) are maintained within a range corresponding to the gaseous state of the monomer, (b) gaseous unpolymerized monomer mixed with hydrogen is discharged from the polymerization kettle (2) via a discharge line (4), the monomer is liquefied and stored in a condenser-cooler-accumulator system (5) and is reintroduced, as liquid, into the polymerization kettle (2) via a line (6), (c) the temperature in the stirred loose bed is regulated by continuously measuring it and, if there is a temperature change, varying, by means of a regulating valve (7), the amount of liquid monomer, vaporizing in the polymerization kettle (2), which is introduced per unit time, and (d) the monomer consumed by polymerization, plus any monomer discharged with the polymer, is replaced by supplying fresh monomer through one or more lines (8), and the hydrogen required to maintain the desired concentration is replenished.

Processes of this type have been disclosed and are operated successfully in industry.

In particular, reference may be made to the process disclosed in German Pat. No. 2,049,622 (approximately equivalent to British Pat. No. 1,354,000 and U.S. Pat. No. 4,012,573), which can essentially be regarded as the basis of the process according to the invention.

It is an object of the present invention to modify the conventional process so as to allow it to be carried out with even greater success, essentially through, inter alia, increasing the period for which the process can be run without faults, and, in particular, increasing the degree to which the properties of the products, especially their melt index (an appropriate measure of the molecular weight), remain constant with time.

We have found that this object is achieved if the process defined at the outset is modified by imposing the further measures that (e) liquid monomer is taken from the condenser-cooler-accumulator system (5) by means of a pump (9), (f) a proportion of the liquid monomer taken off by means of the pump (9) is introduced into the polymerization kettle (2) by means of a branch line (10) via an ejector (11), with the liquid monomer as the jetting medium, (g) the gaseous phase remaining in the condenser-cooler-accumulator system (5) is fed to the polymerization kettle (2) by means of a line (12), via the intake side of the ejector (11), and (h) the amount of the gaseous phase which remains in the condenser-cooler-accumulator system (5) and is taken off via the line (12) is so regulated, by means of a valve (13), that the amount of gaseous phase actually remaining in the system (5) remains constant with time.

Accordingly, the invention relates to a process for the preparation of a propylene homopolymer or copolymer which contains more than 50, especially more than 80, % by weight of propylene and less than 50, especially less than 20, % by weight of other α-monoolefins, of 2 to 6, especially of 2 to 4, carbon atoms, as copolymerized units, by polymerizing the monomer or monomers in the presence of hydrogen as a molecular weight regulator, using a Zielger-Natta catalyst, at from 40° to 150° C., especially from 50° to 110° C., under a total pressure of from 10 to 50 bar, especially from 15 to 40 bar, in the gas phase in a stirred loose bed of finely divided polymer, with removal of the heat of polymerization by evaporative cooling, the monomer mixed with hydrogen being introduced continuously or batchwise into a polymerization kettle (2) via a line (1), and the polymer being discharged continuously or batchwise from the polymerization kettle (2) via a discharge line (3), with the provisos that (a) the pressure and temperature in the polymerization kettle (2) are maintained within a range corresponding to the gaseous state of the monomer, (b) gaseous unpolymerized monomer mixed with hydrogen is discharged from the polymerization kettle (2) via a discharge line (4), the monomer is liquefied and stored in a condenser-cooler-accumulator system (5) and is reintroduced, as liquid, into the polymerization kettle (2) via a line (6), (c) the temperature in the stirred loose bed is regulated by continuously measuring it and, if there is a temperature change, varying, by means of a regulating valve (7), the amount of liquid monomer, vaporizing in the polymerization kettle (2), which is introduced per unit time, and (d) the monomer consumed by polymerization, plus any monomer discharged with the polymer, is replaced by supplying fresh monomer through one or more lines (8), and the hydrogen required to maintain the desired concentration is replenished, wherein (e) liquid monomer is taken from the condenser-cooler-accumulator system (5) by means of a pump (9), (f) a proportion of the liquid monomer taken off by means of the pump (9) is introduced into the polymerization kettle (2) by means of a branch line (10) via an ejector (11), with the liquid monomer as the jetting medium, (g) the gaseous phase remaining in the condenser-cooler-accumulator system (5) is fed to the polymerization kettle (2) by means of a line (12), via the intake side of the ejector (11), and (h) the amount of the gaseous phase which remains in the condenser-cooler-accumulator system (5) and is taken off via the line (12) is so regulated, by means of a valve (13), that the amount of gaseous phase actually remaining in the system (5) remains constant with time.

The following details relating to the novel process may be noted:

(A) Materials used

The monomer to be polymerized can be of the conventional type, ie. propylene alone or a mixture of propylene with one or more other $C_2$–$C_6$-α-monoolefins, eg. ethylene, n-but-1-ene, n-hex-1-ene or 4-methylpent-1-ene. We have found that the novel process is particularly suitable for the preparation of propylene homopolymers, binary copolymers of propylene and ethylene and ternary copolymers of propylene, ethylene and n-but-1-ene. The polymers are obtained in a particulate form, as a fine or coarse grit, the particle size depending, as in the conventional processes, on the specific process conditions chosen. In general, the particle diameter of the polymers is from about 0.03 to 10, in particular from about 0.1 to 5, mm.

The polymerization is effected by means of a catalyst of the Ziegler-Natta type. Very many such catalysts are known, particularly effective examples being the two-component catalysts of (I) a titanium trichloride component and (II) an aluminum-alkyl component of the general formula $AlR_3$ or $ClAlR_2$, where R is $C_1$–$C_8$-alkyl, the atomic ratio of titanium from catalyst component (I) to aluminum from catalyst component (II) being from 1:1 to 1:100.

In turn, in these two-component catalysts the titanium trichloride component (I) can take many different forms, amongst which the following two groups, inter alia, are particularly suitable for use in the process according to the invention: (Ia) Titanium trichlorides as such and titanium trichlorides co-crystallized with metal halides, especially aluminum chloride, for example of the formula $TiCl_3 \cdot \frac{1}{3}AlCl_3$. Cf. for example, U.S. Pat. Nos. 3,128,252 and 3,814,743. We have found that amongst this group a very finely divided co-crystalline material of the formula $TiCl_3 \cdot \frac{1}{3}AlCl_3$ is particularly suitable. (Ib) Titanium trichlorides or co-crystallized titanium trichlorides, of the type described under (Ia), modified with electron donors or Lewis bases. There are numerous such modified titanium trichloride catalyst components, since they are known to offer a range of advantages. Reference may be made, for example, to British Pat. No. 851,113.

For the purposes of the present invention, this group is the most suitable, especially the very finely divided co-crystallized materials of the formula $TiCl_3 \cdot \frac{1}{3}AlCl_3$ modified with the following donors or bases: ethers, eg. diisoamyl ether and diisopentyl ether, esters, eg. isoamyl benzoate and ethyl phenylacetate, phosphines, eg. tributylphosphine, phosphine oxides, eg. tributylphosphine oxide, and acid amides, eg. hexamethylphosphorotriamide.

In each case, the type of modification may be of the relevant conventional type, particularly suitable examples being those given in British Patent Nos. 1,447,706, 1,485,181 and 1,512,730 and U.S. Pat. Nos. 4,120,823, 4,154,699, 4,154,700 and 4,229,318.

Overall, therefore, the materials employed in the process according to the invention are of the relevant conventional type.

(B) Process details

The process is fundamentally based on the techniques for the preparation of propylene homopolymers or propylene copolymers in the gas phase, as disclosed, for example, in British Pat. Nos. 837,301, 1,006,469 and 1,032,945. The principles of these techniques are, notwithstanding their age, basically still fully applicable in the novel process, so that more detailed comment is not needed.

More specifically, the process according to the invention is essentially based, as mentioned at the outset, on the process disclosed in German Pat. No. 2,049,622 (approximately equivalent to British Pat. No. 1,354,020 and U.S. Pat. No. 4,012,573), and accordingly again does not require more specific discussion.

However, as regards the characterizing features of the novel process, it is to be noted that the conventional process defined at the outset is modified by the additional provisos that (e) liquid monomer is taken from the condenser-cooler-accumulator system (5) by means of a pump (9), (f) a proportion of the liquid monomer taken off by means of the pump (9) is introduced into the polymerization kettle (2) by means of a branch line (10) via an ejector (11), with the liquid monomer as the jetting medium, (g) the gaseous phase remaining in the condenser-cooler-accumulator system (5) is fed to the polymerization kettle (2) by means of a line (12), via the intake side of the ejector (11), and (h) the amount of the gaseous phase which remains in the condenser-cooler-accumulator system (5) and is taken off via the line (12) is so regulated, by means of a valve (13), that the amount of gaseous phase actually remaining in the system (5) remains constant with time.

These measures are readily implemented by a skilled worker, especially since the equipment they require is of a conventional type. This is also true of the ejector (11), which can be a conventional jet pump and serves to draw in, by means of the liquid monomer flowing through the branch line (10), as the jetting medium, the gaseous phase remaining in the condenser-cooler-accumulator system (5), and eject it, mixed with the liquid monomer, into the polymerization kettle (2). It is necessary to set the proportion of liquid monomer flowing through the branch line (10) to be such that the remaining proportion of liquid monomer, flowing through the regulating valve (7), is sufficiently great to conform reliably, and unaided, to proviso (c). Apart from this, the ratio of the two proportions of liquid monomer is not critical. However, it has been found advantageous to keep the proportion flowing through branch line (10) constant with time; the process then proceeds particularly quietly, and it is also particularly simple to conform to measure (h), for example by automatically operating the valve (13) by means of a device which measures the amount of gaseous phase present in the condenser-cooler-accumulator system (5).

EXAMPLE

The process is carried out with an appropriate conventional polymerization kettle, equipped with a stirrer and having a useful volume of 12.5 $m^3$.

In the reactor, a propylene homopolymer of melt index about 1.8 (under 2.16 kg at 230° C.) is prepared by polymerizing propylene in the presence of hydrogen by means of a Ziegler-Natta catalyst at 75° C., under a propylene pressure of 28 bar and a hydrogen pressure of 0.1 bar, in the gas phase in a stirred loose bed of finely divided polymer having particle diameters of from 0.2 to 4 mm.

The Zielger-Natta catalyst used consists of (I) a titanium trichloride component prepared according to Example 2 of British Pat. No. 1,485,181 and (II) an aluminum-alkyl component, namely diethyl-aluminum chloride. These catalyst components are introduced separately from one another into the polymerization zone, at the rate of 300 g/h of component (I) and 800 g/h of component (II), corresponding to a molar ratio of Ti from (I) to Al from (II) of about 1:5.

The other basic conditions are selected, in accordance with German Pat. No. 2,049,622 (equivalent to British Pat. No. 1,354,020 and U.S. Pat. No. 4,012,573), in such a way that the heat of polymerization is removed by evaporative cooling, the monomer mixed with hydrogen (total 7,800 kg/h) being introduced continuously, through a line (1), into the polymerization kettle (2), and the polymer (about 1,100 kg/h) being discharged batchwise from the polymerization kettle (2) through a discharge line (3), with the provisos that (a) the pressure and temperature in the polymerization kettle (2) are maintained within a range corresponding to the gaseous state of the monomer (this being achieved by the above conditions), (b) gaseous unpolymerized monomer mixed with hydrogen (totalling about 6,400 kg/h) is discharged from the polymerization kettle (2) via a discharge line (4), the monomer is liquefied and stored in a condenser-cooler-accumulator system (5) and is reintroduced, as liquid, into the polymerization kettle (2) via a line (6), (c) the temperature in the stirred loose bed is regulated by continuously measuring it and, if there is a temperature change, varying, by means of a regulating valve (7), the amount of liquid monomer, vaporizing in the polymerization kettle (2), which is introduced per unit time, and (d) the monomer consumed by polymerization, plus the monomer discharged with the polymer, is replaced by supplying fresh monomer (about 1,400 kg/h) through a line (8), and the hydrogen required to maintain the desired concentration is replenished (about 0.12 kg/h).

In accordance with the invention, the process is specifically so designed that additionally (e) liquid monomer (about 6,400 kg/h) is taken from the condenser-cooler-accumulator system (5) by means of a pump (9), (f) a proportion (about 3,250 kg/h, constant with time) of the liquid monomer taken off by means of the pump (9) is introduced into the polymerization kettle (2) by means of a branch line (10) via an ejector (11), with the liquid monomer as the jetting medium, (g) the gaseous phase remaining in the condenser-cooler-accumulator system (5) is fed to the polymerization kettle (2) by means of a line (12), via the intake side of the ejector (11), and (h) the amount (about 8 m³/h) of the gaseous phase which remains in the condenser-cooler-accumulator system (5) and is taken off via the line (12) is so regulated, by means of a valve (13), that the amount of gaseous phase actually remaining in the system (5) remains constant with time.

In this way, the polymerization process can be operated for a relatively long time without any problems; moreover, the properties of the polymer obtained, including in particular the melt index, remain very constant with time.

We claim:

1. A process for the preparation of a propylene homopolymer or copolymer which contains more than 50% by weight of propylene and less than 50% by weight of other α-monoolefins, of 2 to 6 carbon atoms, as copolymerized units, by polymerizing the monomer or monomers in the presence of hydrogen as a molecular weight regulator, using a Zielger-Natta catalyst, at from 40° to 150° C., under a total pressure of from 10 to 50 bar, in the gas phase in a stirred loose bed of finely divided polymer, with removal of the heat of polymerization by evaporative cooling, the monomer mixed with hydrogen being introduced continuously or batchwise into a polymerization kettle, and the polymer being discharged continuously or batchwise from the polymerization kettle, with the provisos that (a) the pressure and temperature in the polymerization kettle are maintained within a range corresponding to the gaseous state of the monomer,
    (b) gaseous unpolymerized monomer mixed with hydrogen is discharged from the polymerization kettle, the monomer is liquefied and stored in a condenser-cooler-accumulator system and is reintroduced, as liquid, into the polymerization kettle,
    (c) the temperature in the stirred loose bed is regulated by continuously measuring it and, if there is a temperature change, varying, the amount of liquid monomer, vaporizing in the polymerization kettle, which is introduced per unit time, and
    (d) the monomer consumed by polymerization, plus any monomer discharged with the polymer, is replaced by supplying fresh monomer through one or more lines and the hydrogen required to maintain the desired concentration is replenished, wherein
    (e) liquid monomer is taken from the condenser-cooler-accumulator system by means of a pump,
    (f) a proportion of the liquid monomer taken off by means of the pump is introduced into the polymerization kettle by means of a branch line via an ejector, with the liquid monomer as the jetting medium,
    (g) the gaseous phase remaining in the condenser-cooler-accumulator system is fed to the polymerization kettle by means of a line, via the intake side of the ejector, and
    (h) the amount of the gaseous phase which remains in the condenser-cooler-accumulator system and is taken off via the line is so regulated, by means of a valve, that the amount of gaseous phase actually remaining in the system remains constant.

* * * * *